Patented Apr. 18, 1950

2,504,552

UNITED STATES PATENT OFFICE 2,504,552

HYDRAULIC TORQUE CONVERTER FLUID

Arthur W. Lewis, Plainfield, N. J., assignor to Tide Water Associated Oil Company, Bayonne, N. J., a corporation of Delaware No Drawing. Application January 25, 1945, Serial No. 574,631

19 Claims. (Cl. 252—75)

1

This invention relates to new compositions of matter and more particularly to fluids adapted for use in fluid couplings for the transmission of power.

An object of the present invention is to provide an improved fluid composition adapted for use in fluid couplings. Another object is to provide an improved power transmission fluid having a mineral oil base. A further object is to provide a stabilized power transmission fluid particularly effective for use in torque converter types of fluid couplings. The invention has as a further object a method for transmitting power comprising use of stabilized power transmission fluids.

Fluid couplings are employed in transmitting engine torque, particularly in automotive vehicles where they replace or supplement the usual mechanical clutch and transmit power from the engine to the wheels through a suitable liquid or power transmission fluid. Two general types are in present use: (1) the "fluid drive" or fluid clutch, which is employed in pleasure cars and which generally consists of a set of rotary driving blades imparting torque or power to a similar set of driven blades through a fluid medium; and (2) the hydraulic torque converter, now employed for more heavy duty work as on busses and the like. The torque converter is similar to the fluid clutch in transmitting power through a fluid from engine to wheels, but differs therefrom in that the fluid is pumped or forced at relatively high velocity by the driving members through stationary blades to driven members, and in having quite different torque transmitting characteristics.

Under fluid coupling operating conditions, power transmission fluids become heated. Fluid coupling devices for heavy duty use generally are equipped with coolers to dissipate the heat generated in the transmission fluid. Certain torque converters of the type described above comprise a fluid by-pass system whereby the transmission fluid may be conducted to a radiator or the like for cooling. Designed operation of this type of apparatus may require removal from the transmission fluid of a minimum of 10 per cent of the input energy as heat, and under more severe conditions, this figure may rise to 40 per cent.

Power transmission fluids for the stated use are generally required to have relatively low viscosity characteristics. Mineral oil fractions of the requisite low viscosity heretofore have not been satisfactory because, under the conditions encountered in use, they deteriorate and form sludge which deposits on the coupler parts, resulting in impaired efficiency and necessitating frequent replacement of fluid, and because their low flash points present a fire hazard. Deposition of sludge on the coupler blades changes their contour, thus altering the designed characteristics of the device, and causes excessive vibration. Sludge deposition in the cooling radiators and ducts reduces the flow of fluid therethrough which causes overheating and vaporization of the oil with consequent failure of power transmission by the coupling. The rate of sludge formation apparently is accelerated by contact of the oil with the metal surfaces of the coupling.

The composition of the present invention comprises an oil having the required low viscosity with highest practicable flash point and other physical characteristics making it adaptable for power transmission use, particularly for hydraulic torque converter use, and a minor proportion of an added material effective to stabilize the composition under usage conditions. In more specific aspect, the composition comprises a power transmission fluid containing a suitable oil and an additive component effective to reduce or inhibit deposition of sludge.

The characteristics of the oil base will, of course, vary somewhat with the particular type of fluid coupling in which it is intended to be used. In general, however, the oil component will be of lower viscosity than lubricating oils such as motor oils, and desirably of relatively high flash point. By way of illustration, there may be used petroleum oil fractions having viscosities varying from that of gas oil and Diesel fuel oil up to that of low viscosity lubricating oils. Preferably, the mineral oil component has a viscosity at 100° F. of from about 30 S. U. S. to about 120 S. U. S. Mineral oils derived from Pennsylvania crude are preferred over those from naphthenic or coastal crudes as having the highest flash points, and thus affording the lowest fire hazard, at the low viscosities required for most efficient fluid coupler operation. Second preference are East Texas fractions which have viscosity-flash characteristics almost as desirable as oils from Pennsylvania crudes.

The additive component of the composition of the invention is essentially of the detergent type, by which is meant a material capable of peptizing or maintaining in suspension sludge which may be formed under usage conditions. In addition to detergent properties, the additive component desirably should be effective to inhibit deterioration of the mineral oil composition under the conditions of use. As explained above, sludge formation, due to deterioration of the light mineral oil under fluid coupling operation conditions, is accelerated by metal surfaces. Inclusion in the composition of a suitable substance effective to passivate metal surfaces has been found to materially reduce the rate of sludge formation. Therefore, the additive component is preferably one which will suitably passivate or deactivate the metal parts of the fluid coupling normally accelerating sludge formation, as well as disperse any sludge formed.

These combined sludge-dispersing and oil-stabilizing effects may be obtained by a single additive compound of the detergent-inhibitor type having dual properties or effectiveness, but generally it will be preferred to employ two or more compounds possessing the respective properties. In the latter instance, care must be taken to select compounds which are mutually compatible.

Various compounds are effective for use in certain motor lubricating oils for the purpose of dispersing sludge formed under heavy duty motor operation, such sludge resulting in part from products of combustion; and selected compounds of this type may be used in the power transmission fluid compositions of this invention. However, it has been found that, in general, detergent-type additive compounds tend to promote relatively rapid deterioration and sludging of light mineral oils having physical characteristics essential for fluid coupling use. Thus, it is desired, for purposes of this invention, to select sludge-dispersing agents having minimum oil-deteriorating properties, as respects the particular types of mineral oils to be used.

According to this invention, particularly good results are obtained with use, as a detergent material, of certain compounds or salts of sulphonic acids, for example, the alkali metal or alkaline earth salts of mahogany acids, which are soluble in the mineral oil in sludge-dispersing proportions. Examples of such substances are sodium and calcium salts of mahogany acids. Other detergent-type materials are certain phenates, such as metal phenates of alkyl phenol thio ethers, for example, barium diamyl thiophenate and barium dioctyl thiophenate; certain oil soluble fatty acid salts; and salts of wax alkylated phenols, especially those of barium and calcium. In general, use of any suitable detergent or sludge-suspending agent which is sufficiently oil-soluble and which does not possess undesirably high oil-deterioration characteristics is intended, within the scope of this invention.

Likewise, many suitable compounds, effective as oil-deterioration inhibitors, may be incorporated. Those which have been found particularly suitable, and effective to passivate metal surfaces or otherwise inhibit formation of sludge under conditions of power transmission fluid use, are certain compounds or compositions containing both phosphorus and sulfur. Especially efficacious in this respect are certain oil-soluble salts of thiophosphoric acid esters obtainable by reacting aliphatic or cycloaliphatic alcohols with phosphorus pentasulfide and which are apparently di(alkyl or cycloalkyl) thio esters of phosphoric acids. These compounds, when dissolved in relatively small proportions in the mineral oil component, are effective metal passivators and oil-stabilizing agents, and, in addition, possess detergent properties to some degree. Among other additives functioning as metal passivators contemplated for use may be mentioned certain phosphorus pentasulfide-polymer reaction products; and the phenates of alkyl phenol thio ethers mentioned above, the latter materials having both detergent and oil-stabilizing effectiveness.

Regarding the proportionate amounts of added materials to be incorporated in the oil compositions forming the power transmission fluids of this invention, these materials are effective in the composition in relatively small amounts. Amounts suitable in all instances cannot be stated with certainty inasmuch as they will vary with the particular additives employed, and also with the type of oil used for the base. Generally, less of the detergent additive will be required in refined mineral oils than in those which have not been refined. In any event, the additive material will be in minor proportion as regards the mineral oil component and usually will not amount to more than about 10 per cent by weight of the composition.

The power transmission fluids of this invention are not subject to the disadvantages mentioned earlier herein. By maintaining in suspension the sludge and other solid material resulting from deterioration of the mineral oil in torque converter use, not only is vibration and loss of efficiency, caused by sludge deposition on the converter blades, reduced or eliminated, but sludge deposition in the cooling system is prevented. This latter result permits the fluid to operate at the designed temperature and prevents undesired vaporization.

The following examples will illustrate power transmission fluid compositions of the present invention.

Example I

A dewaxed heavy gas oil fraction, derived from a Pennsylvania crude, and having a flash point of 335° F. and viscosity at 100° F. of 57.3 S. U. S., was employed as the mineral oil component in preparing a torque converter power transmission fluid. This fraction was unrefined, in that it had not been solvent refined or decolorized. There was dissolved in this oil 4.5 per cent by weight of a composition known as "Lubrizol 738." Analysis of the latter material indicates that it contains about 25 per cent by weight of calcium salts of mahogany acids and about 10.8 per cent by weight of zinc salts of di(alkyl cyclohexyl) dithiophosphates, dissolved in petroleum oil as the remaining constituent.

Example II

A power transmission fluid was prepared by dissolving 4.5 per cent by weight of "Lubrizol 738" in a light oil having a viscosity of 106 S. U. S. at 100° F. This oil was a gas oil fraction of an East Texas crude, which had been decolorized and dewaxed but otherwise not refined.

Example III

The base oil for the power transmission fluid in this instance was an overhead fraction of East Texas crude having a viscosity of 91.5 S. U. S. at 100° F., produced as described in Example II above.

There was dissolved in this fraction about 2.2 per cent by weight of a commercial additive which analyzes 6 parts of barium dilauryl thiophosphate to 1 part barium diamyl thio phenate.

Illustrative of the effectiveness of the improved power transmission fluids of the invention under usage conditions, the Example II composition was installed in a hydraulic torque converter of a large passenger bus and the bus was operated in urban and inter-urban use, involving frequent stopping and starting and hill-climbing under full and part load conditions for a total of 24,864 miles. Inspection of the fluid from time to time and observation of the vehicle performance characteristics showed no evidence of vaporization or other difficulty impairing efficiency during the test period. The torque converter mechanism was inspected at the above-noted mileage and was found to be clean and free of deposits. The used fluid from this run showed little evidence of deterioration and apparently was good for many more miles of satisfactory service.

Similar test runs were made, using as transmission fluid the compositions of Examples I and II, with satisfactory results comparing favorably with those obtained in regard to the Example II composition.

Busses operated under similar conditions, employing in their hydraulic torque converters straight mineral oils, including No. 2 fuel oils and mineral seal oils, were found to be running at efficiencies of only about 30 per cent of that obtained at the start of the run, due to effects of vaporization because of overheating of the converter fluid and other difficulties caused by sludge deposition and oil-deterioration during operation.

It should be noted that this invention permits use of relatively low cost stocks in power transmission fluids, the additive components being effective in relatively unrefined mineral oils. This feature, plus the relatively long service life of the fluid, infrequent dismantling of the fluid couplings required for cleaning purposes, and high efficiency of these devices occasioned by its use therein, makes the power transmission fluids of the invention economically attractive.

A further advantage of considerable importance, from an economic viewpoint, lies in the fact that the power transmission fluids of the invention exert little or no attack on synthetic rubber gaskets or seals used in certain fluid couplings for fluid retention. Certain other oils, which have been tried as power transmission fluids, cause hardening of these synthetic rubber seals with resulting leakage and loss of fluid.

I claim:

1. A composition, adapted for use as a power transmission fluid in modern hydraulic torque converters, comprising at least about 90% by weight of a mineral oil having a viscosity of about 30 to 120 S. U. S. at 100° F. and a flash point of at least 300° F. and at least one detergent additive from the group consisting of oil-soluble metal salts of sulphonic acids, oil-soluble metal salts of alkyl phenol thioethers, oil-soluble metal salts of wax alkylated phenols and oil-soluble metal salts of fatty acids in an amount sufficient to impart detergent properties to said oil.

2. A composition, as defined in claim 1, containing an oil-soluble metal salt of a thiophosphoric acid ester in an amount sufficient to inhibit deterioration of the oil.

3. A composition, adapted for use as a power transmission fluid in modern hydraulic torque converters, consisting essentially of a mineral oil having a viscosity of about 30 to 120 S. U. S. at 100° F. and a flash point of at least 300° F., an oil-soluble metal salt of a sulphonic acid in an amount sufficient to impart detergent properties to said oil, and an oil-soluble metal salt of a thiophosphoric acid ester in an amount sufficient to inhibit deterioration of said oil, the total amount by weight of the detergent and deterioration-inhibiting additives being less than about 10%.

4. A composition, as defined in claim 3, wherein the detergent is a metal salt of a mahogany acid.

5. A composition, as defined in claim 3, wherein the detergent is an alkali metal salt of a mahogany acid.

6. A composition, as defined in claim 3, wherein the detergent is an alkaline earth salt of a mahogany acid.

7. A composition, as defined in claim 3, wherein the detergent is a calcium salt of a mahogany acid.

8. A composition, as defined in claim 3, wherein the deterioration-inhibitor is a metal salt of a dialkyl thiophosphate.

9. A composition, as defined in claim 3, wherein the deterioration-inhibitor is a zinc salt of a dialkyl thiophosphate.

10. A composition, as defined in claim 3, wherein the deterioration-inhibitor is a barium salt of a dialkyl thiophosphate.

11. A composition, as defined in claim 1, wherein the mineral oil is a fraction derived from a highly paraffinic petroleum crude.

12. A composition, as defined in claim 1, wherein the mineral oil has a viscosity of about 30 to about 90 S. U. S. at 100° F.

13. A composition, as defined in claim 1, which, in addition, contains an oil soluble metal salt of a thiophosphoric acid ester in an amount sufficient to inhibit deterioration of the oil and the mineral oil has a viscosity of about 30 to about 90 S. U. S. at 100° F.

14. A composition, as defined in claim 13, wherein the mineral oil is a fraction derived from a highly paraffinic petroleum crude.

15. A composition, adapted for use as a power transmission fluid in hydraulic torque converters, comprising at least about 90% by weight of a mineral oil having a viscosity of about 57 S. U. S. at 100° F. and a flash point of about 335° F., a calcium salt of a mahogany acid in an amount sufficient to impart detergent properties to said oil and a zinc salt of a thiophosphoric acid ester in an amount sufficient to inhibit deterioration of said oil.

16. A method for highly efficient operation of a fluid coupling of the torque converter type with a power transmission fluid having a viscosity of about 30 to 120 S. U. S. at 100° F. which comprises operating said torque converter with a power transmission fluid comprising at least about 90% by weight of a mineral oil having a viscosity of about 30 to 120 S. U. S. at 100° F. and a flash point of at least 300° F. and at least one detergent additive from the group consisting of oil soluble metal salts of sulphonic acids, oil-soluble metal salts of alkyl phenol thioethers, oil-soluble metal salts of wax alkylated phenols and oil-soluble metal salts of fatty acids in an amount sufficient to impart detergent properties to said oil.

17. A method, as defined in claim 16, wherein the mineral oil has a viscosity of about 30 to 90 S. U. S. at 100° F.

18. A method, as defined in claim 16, wherein the power transmission fluid contains, in addition to the detergent, a small amount, sufficient to inhibit deterioration of the oil, of an oil-soluble metal salt of a thiophosphoric acid ester.

19. A method, as defined in claim 18, wherein the mineral oil has a viscosity of about 30 to 90 S. U. S. at 100° F.

ARTHUR W. LEWIS.

REFERENCES CITED

The following references are of record in the file of this patent:

UNITED STATES PATENTS

| Number | Name | Date |
|---|---|---|
| 1,626,998 | Wright | May 3, 1927 |
| 1,853,341 | Djidich | Apr. 12, 1932 |
| 1,935,595 | Clark | Nov. 14, 1933 |
| 1,970,564 | Hoover | Aug. 21, 1934 |
| 1,988,584 | Dana et al. | Jan. 22, 1935 |
| 2,023,367 | Krekeler | Dec. 3, 1935 |
| 2,058,899 | Matheson | Oct. 27, 1936 |
| 2,102,638 | Moses | Dec. 21, 1937 |
| 2,213,423 | Wiezevich | Sept. 3, 1940 |
| 2,252,985 | Rutherford | Aug. 19, 1941 |
| 2,257,751 | Lincoln et al. | Oct. 7, 1941 |
| 2,356,367 | Wright | Aug. 22, 1944 |
| 2,378,820 | Amott | June 19, 1945 |
| 2,382,527 | Allderdice | Aug. 14, 1945 |
| 2,417,876 | Lewis et al. | Mar. 25, 1947 |

FOREIGN PATENTS

| Number | Country | Date |
|---|---|---|
| 123,409 | Great Britain | Feb. 24, 1919 |
| 296,911 | Great Britain | Sept. 13, 1928 |

Certificate of Correction

Patent No. 2,504,552 April 18, 1950

ARTHUR W. LEWIS

It is hereby certified that error appears in the printed specification of the above numbered patent requiring correction as follows:

Column 5, lines 17 and 18, for "Examples I and II" read *Examples I and III*;

and that the said Letters Patent should be read with this correction therein that the same may conform to the record of the case in the Patent Office.

Signed and sealed this 18th day of July, A. D. 1950.

[SEAL]

JOE E. DANIELS,
*Assistant Commissioner of Patents.*